United States Patent
Millerd

(10) Patent No.: US 8,351,048 B2
(45) Date of Patent: Jan. 8, 2013

(54) LINEAR-CARRIER PHASE-MASK INTERFEROMETER

(75) Inventor: James E. Millerd, Tucson, AZ (US)

(73) Assignee: 4D Technology Corporation, Tucson, AZ (US)

( * ) Notice: Subject to any disclaimer, the term of this patent is extended or adjusted under 35 U.S.C. 154(b) by 281 days.

(21) Appl. No.: 12/856,723

(22) Filed: Aug. 16, 2010

(65) Prior Publication Data

US 2010/0309476 A1    Dec. 9, 2010

Related U.S. Application Data

(63) Continuation-in-part of application No. 11/800,840, filed on May 8, 2007, now Pat. No. 7,777,895, which is a continuation-in-part of application No. 10/838,694, filed on May 4, 2004, now Pat. No. 7,230,717, which is a continuation-in-part of application No. 10/652,903, filed on Aug. 29, 2003, now Pat. No. 7,057,737.

(60) Provisional application No. 60/498,522, filed on Aug. 28, 2003, provisional application No. 60/523,778, filed on Nov. 20, 2003.

(51) Int. Cl.
*G01B 9/02* (2006.01)
(52) U.S. Cl. .......................................... 356/491
(58) Field of Classification Search .................. None
See application file for complete search history.

(56) References Cited

U.S. PATENT DOCUMENTS

| 5,166,751 | A | 11/1992 | Massig |
| 5,953,124 | A | 9/1999 | Deck |
| 6,304,330 | B1 * | 10/2001 | Millerd et al. ................ 356/521 |
| 2003/0072079 | A1 * | 4/2003 | Silverstein et al. ........... 359/486 |
| 2004/0190573 | A1 * | 9/2004 | Kruschwitz et al. ............ 372/39 |

\* cited by examiner

*Primary Examiner* — Tu Nguyen
(74) *Attorney, Agent, or Firm* — Antonio R. Durando

(57) ABSTRACT

A phase-difference sensor measures the spatially resolved difference in phase between orthogonally polarized reference and test wavefronts. The sensor is constructed as a linear-carrier phase-mask aligned to and imaged on a linear-carrier detector array. Mireau and Fizeau polarization interferometric objectives are implemented with a thin conductive wire grid optically coupled to the objective beam splitter.

8 Claims, 9 Drawing Sheets

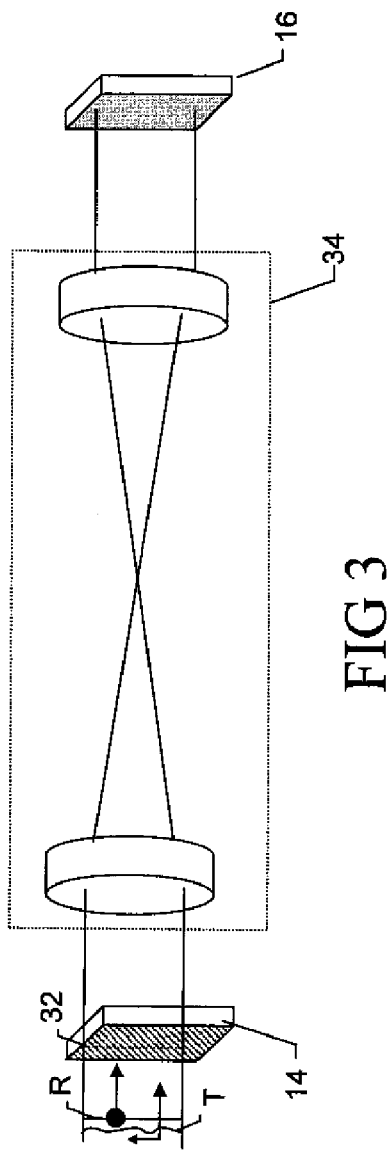
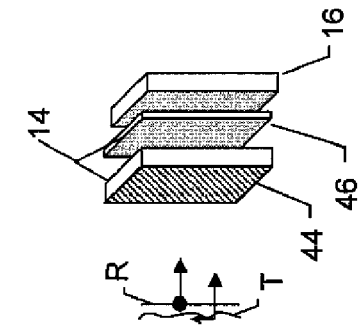
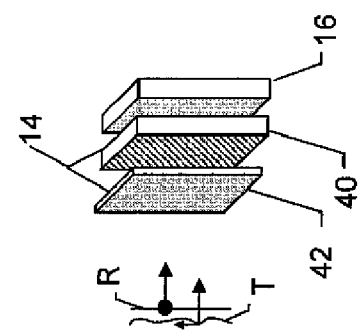
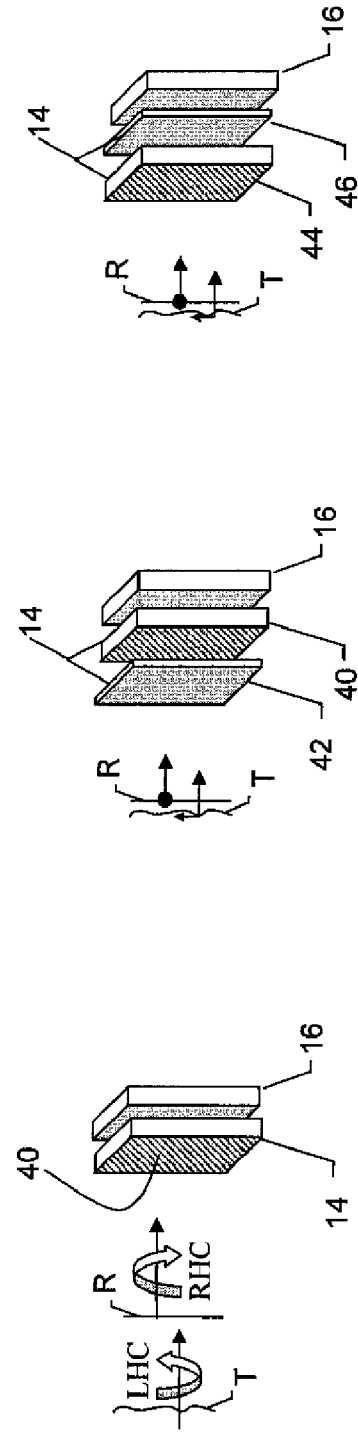

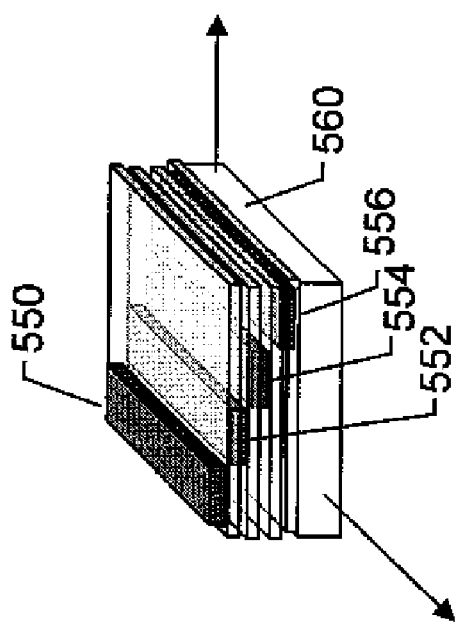
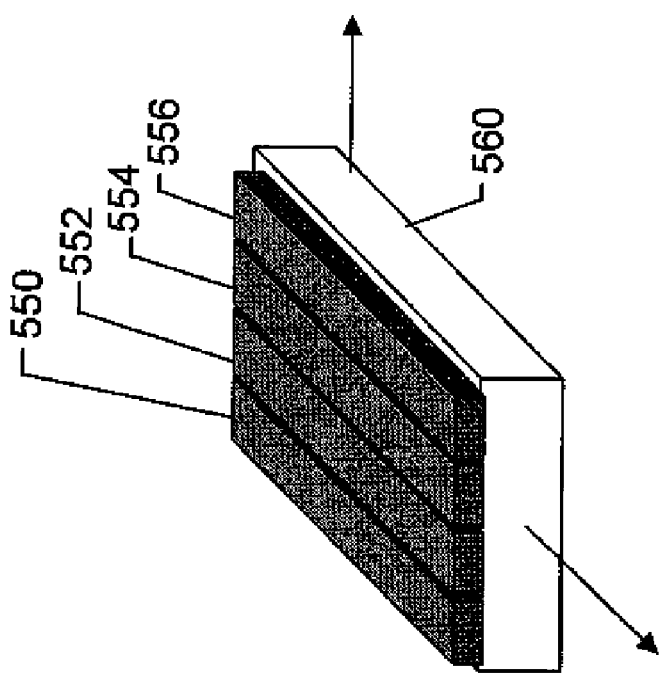
FIG 7B
FIG 7A

LINEAR-CARRIER PHASE-MASK INTERFEROMETER

RELATED APPLICATIONS

This application is a continuation-in-part application of Ser. No. 11/800,840, filed May 8, 2007, hereby incorporated by reference, which was a continuation-in-part application of Ser. No. 10/838,694, filed May 4, 2004, issued as U.S. Pat. No. 7,230,717, hereby incorporated by reference, which was based on and claimed the benefit of U.S. provisional application Ser. No. 60/498,522, filed Aug. 28, 2003, and Ser. No. 60/523,778, filed Nov. 20, 2003, and was a continuation-in-part application of Ser. No. 10/652,903, filed Aug. 29, 2003, now issued as U.S. Pat. No. 7,057,737, hereby incorporated by reference.

BACKGROUND OF THE INVENTION

1. Field of the Invention

The present invention relates to interferometry. More particularly, the invention relates to methods and apparatus for rapid measurement of the optical phase-difference between two wavefronts. The invention may be implemented in optical systems that measure various parameters of test objects by generating test and reference waves having orthogonal polarizations.

2. Description of the Related Art

Phase-shift interferometry is an established method for measuring a variety of physical parameters ranging from the density of gases to the displacement of solid objects. An interferometric wavefront sensor employing phase-shift interferometry typically consists of a light source that is split into two wavefronts, a reference and a test wavefront, that are later recombined after traveling different path lengths. The relative phase difference between the two wavefronts is manifested as a two-dimensional intensity pattern known as an interferogram. Phase-shift interferometers typically have an element in the path of the reference or the test wavefront to introduce three or more known phase steps or phase shifts. By detecting the intensity pattern with a detector at each of the phase shifts, the phase distribution of the object wavefront can be calculated quantitatively and rapidly independently of the relative energy in the reference or object wavefronts.

Phase shifting of a light beam can either be accomplished by sequentially introducing a phase step (temporal phase shifting) or by splitting the beam into parallel channels for simultaneous phase steps (spatial phase shifting). Spatial phase shifting achieves data acquisition in a time several orders of magnitude smaller than temporal phase shifting, thus offering significant immunity to vibration.

Several methods of spatial phase shifting have been disclosed in the prior art. Smythe and Moore (1983) described a spatial phase-shifting method where conventional beam splitters and polarization optics are used to produce three or four phase-shifted images onto as many cameras for simultaneous detection. Several U.S. Patents [U.S. Pat. No. 4,575,248 (1986), U.S. Pat. No. 4,624,569 (1986), U.S. Pat. No. 5,589,938 (1996), No. 5,663,793 (1997), No. 5,777,741 (1998), and No. 5,883,717 (1999)] later disclosed variations of this approach wherein multiple cameras are used to detect multiple interferograms. These methods all require relatively complex optical and electronic arrangements.

Several publications describe methods that employ diffractive elements to simultaneously image three or more interferograms onto a single sensor. [See, for example, B. Barrientos et. al., "Transient Deformation Measurement with ESPI Using a Diffractive Optical Element for Spatial Phase-stepping," Fringe, Akademie Verlag (1997): 317-8; A. Hettwer, "Three Channel Phase-Shifting Interferometer Using Polarization-Optics and a Diffraction Grating," Optical Engineering, pp. 960, Vol. 39 No. 4, April 2000; and U.S. Pat. No. 4,624,569 (1986), No. 6,304,330 (2001) and No. 6,522,808 (2003).] While these methods are more compact and less expensive than multi-camera arrangements, they operate only over a limited wavelength range due to dispersion and chromatic distortion inherent in their design. Thus, they are not capable of working with white light or short coherence-length source interferometers. The Mireau interferometer configuration is particularly difficult to implement using the techniques of the prior-art [such as disclosed in U.S. Pat. Nos. 5,166,751 and 5,953,124, and in Ngoi, B. K. A., Venkatakrishnan, K., and Sivakumar, N. R., "Phase-shifting Interferometery Immune to Vibration," Applied Optics, Vol. 40, No. 19, P. 3211 (2001)].

Spatial phase shifting has also been accomplished using a tilted reference wave to induce a spatial carrier frequency to the pattern. See, for example, U.S. Pat. No. 5,155,363 (1992) and No. 5,361,312 (1994). The spatial carrier method inherently requires a path-length difference of many hundreds of waves between the test and reference wavefronts, thereby precluding the use of white light. In addition, interferometers employing this arrangement must utilize high precision optics to avoid introducing aberrations between the two non-common path beams. U.S. Pat. No. 4,872,755 (1989) teaches the use of a short coherence-length source in combination with a Fizeau-type interferometer to effect instantaneous phase measurement with either the four camera arrangement of Symthe et. al. or a tilted carrier wave.

The prior art also describes the fabrication of micropolarizer arrays where each element has a different polarizer orientation in a repeating pattern. In particular, U.S. Pat. No. 5,327,285 and No. 6,384,971 describe the fabrication of micropolarizer arrays using multiple film layers for use in stereoscopic viewing. Nordin et al. describe the use of micropolarizer arrays made from fine conducting wire arrays for imaging polarimetry in the near infrared spectrum ("Micropolarizer Array for Infrared Imaging Polarimetry," J. Opt. Soc. Am A, Vol. 16, No. 5, 1999). Recently, the use of wire grid arrays has also been demonstrated in the visible region of the spectrum (see U.S. Pat. No. 6,108,131, No. 6,122,103, No. 6,208,463 and No. 6,243,199). The planar nature of the conducting strip structure permits using it as a polarizer over an extremely wide incident angle, including zero degrees, and over a broad range of wavelengths, provided the period remains much less than the wavelength. Other investigators (J. Gou et. al., "Fabrication of Thin-Film Micropolarizer Arrays for Visible Imaging Polarimetry," Applied Optics, Vol. 39, No. 10, 2000) also describe the use of patterned multi-level organic thin films for imaging polarimetry in the visible spectral range.

This disclosure describes how a linear-carrier phase-mask can be used as an interferometer to measure optical path-length differences at high-speed, with a single detector array and over a broad wavelength range. A novel way of implementing Fizeau and Mirau polarization interferometers is also described.

SUMMARY OF THE INVENTION

This invention provides novel arrangements for performing quantitative, instantaneous measurement of optical path-length differences. The method and apparatus of the invention consist of a phase-difference sensor that quantitatively measures the spatially resolved difference in phase between orthogonally polarized reference and test wavefronts. In accordance with the invention, the phase-difference sensor is combined with a variety of polarization interferometers to measure quantities such as surface height, refractive index, gas density, optical wavefront, and/or surface strain.

The phase-difference sensor of the invention is implemented as a linear-carrier phase-mask (LCPM) that is aligned to and/or imaged on a pixelated detector array. The LCPM is preferably configured in an array of linear regions such that each adjacent region of the array produces a predetermined relative phase-shift between orthogonally polarized reference and test wavefronts. In one embodiment of the invention, the LCPM is disposed directly in contact, or nearly in contact, with the detector array such that it is substantially coincident with the image plane of the optical system. In another embodiment, the LCPM is imaged, via relay optics, onto the detector array. An aperture stop in the optical configuration is employed to limit the input acceptance angle of the incident light and ensure that the slope of the phase difference between the reference and test wavefronts does not exceed predetermined measurement limits.

According to one aspect of the invention, multiple phase-shifted interferograms can be synthesized at the same time by combining pixels with identical phase-shifts. Any of the resulting interferograms can be viewed for alignment of the test setup. The multiple phase-shifted interferograms can be combined to calculate standard parameters such as modulation index or average phase step. The primary measurand, the phase difference, can be calculated by using a standard N-bucket algorithm. In an alternative embodiment, a convolution-type algorithm is employed to calculate the phase at any pixel based on the intensity values at the surrounding pixels. The size of the convolution kernel can be controlled to adjust the tradeoff between spatial resolution and accuracy.

Any configuration of interferometer that produces orthogonally polarized reference and object beams may be combined with the phase-difference sensor of the invention to provide single-shot, simultaneous phase-shifting measurements. This enables measurement of a broad range of physical quantities such as surface height, refractive index gradients, gas density, and/or surface strain. Embodiments of the invention include the use of a Twyman-Green type of interferometer, a Mireau-type interferometer, and a Fizeau-type interferometer. The Fizeau-type interferometer includes a short coherence-length source and a path-length delay arm for producing selectively coherent, orthogonally polarized beams from the test and reference surfaces, respectively.

The LCPM can be constructed using several techniques that combine standard semiconductor photolithography with thin-film polarizer manufacturing techniques. In one embodiment the LCPM is constructed as an array of finely conducting metal strips that are patterned and oriented on one side of a planar substrate. The LCPM can be used directly with a polarization interferometer having orthogonal circular polarizations for the reference and test beams, respectively. For use with linearly polarized reference and test beams, the LCPM further includes quarter-wave retardation plates, preferably achromatic or broadband zero-order type, bonded to the front side of the LCPM substrate.

The present invention accomplishes simultaneous phase-shifting with a single pixelated detector, while avoiding the complexity and chromatic dispersion that accompanies the prior-art approach of splitting the wavefront into sub-images with diffractive optical elements. The invention provides an improved method and apparatus for performing two-wavelength interferometry by increasing the range of operational wavelengths, eliminating the need to calibrate dispersion-related pixel matching, and reducing the complexity of the optical arrangement.

The invention also provides an improvement over prior-art methods employing a tilted reference wave because the reference and test beams can be maintained in a true common-path arrangement throughout the entire imaging region of the interferometer. Therefore, it is not necessary to use high quality optics to preserve wavefront quality and, additionally, broadband or white-light sources can be utilized.

Finally, the invention represents an improvement over the pixelated phase mask described in Ser. No. 10/838,694, herein incorporated by reference, because of its relative ease of manufacture (due to the linear, rather than interdispersed, arrangement of the mask elements) and its relative ease of alignment with the detector array (requiring only rotational and y alignment, rather than rotational and x,y alignment). Other objects, features and advantages of the invention will become apparent to those skilled in the art from a consideration of the following detailed description taken in conjunction with the accompanying drawings and claims.

In a related aspect of the invention, Fizeau and Mireau polarizing interferometers are constructed by depositing a fine grid of conductive wires on the reference surface beam splitter.

BRIEF DESCRIPTION OF THE DRAWINGS

FIG. 3 is a schematic perspective view of an alternative exemplary embodiment of the invention for quantitative measurement of optical path difference, in particular illustrating the use of relay optics between the phase mask and the detector.

FIG. 4A is a schematic perspective view of the linear-carrier phase-mask shown in FIGS. 1-3 suitable for processing reference and test beams with orthogonal circular polarization.

FIG. 4B is a schematic perspective view of another embodiment of the linear-carrier phase-mask of FIGS. 1-3 suitable for processing reference and test beams with orthogonal linear polarization.

FIG. 4C is a schematic perspective view of yet another linear-carrier phase-mask according to the invention suitable for processing reference and test beams with orthogonal linear polarization.

FIG. 7A is a perspective view of a linear-carrier phase-mask illustrating the use of a single layer of polarization elements arranged on a substrate.

FIG. 7B is a perspective view of an alternative embodiment illustrating the use of multiple layers of polarization elements arranged on a substrate.

DETAILED DESCRIPTION OF THE INVENTION

The invention consists of a pixelated detector combined with a linear-carrier phase-mask that is subdivided into a plurality of sets of phase-shifting elements, such that each set produces a predetermined phase shift between orthogonally polarized test and reference beams. Thus, each set of phase-shifting elements provides a spatially separated intensity pattern (interferogram) on corresponding pixels of the detector. By providing at least three such sets of elements in the phase-mask, each associated with a different phase shift, sufficient interferograms are produced to characterize a sample surface using conventional interferometric algorithms. For best results, the linear-carrier phase-mask is preferably distributed uniformly across the detector and aligned so that each row of pixels of the detector corresponding to one set of phase-mask elements is surrounded by adjacent rows of pixels corresponding to other sets of phase-mask elements. Similarly, for best resolution, a one-to-one correspondence is preferably used between the width of the linear-carrier phase-mask elements and the effective pitch of the detector pixels.

Thus, various parameters of test objects may be measured by simultaneously generating multiple phase-shifted interferograms on a single sensor array. As disclosed below, the invention may implemented in various configurations to measure optical phase-difference between a reference and a test wavefront in real time; to perform profilometry of an object (that is, to measure the absolute three-dimensional profile of a solid object) with a dynamic range of sub-angstrom to centimeters; to measure the displacement (e.g., thermal strain or vibration) of an object; to measure the wavefront quality of light sources, such as in optical data-storage pickup/transmit assemblies; and to measure flow parameters in a multiphase environment. Examples of such flow parameters include the concentration of selected gaseous species, temperature distributions, particle and droplet size distributions, density, and so on.

Figure 1:
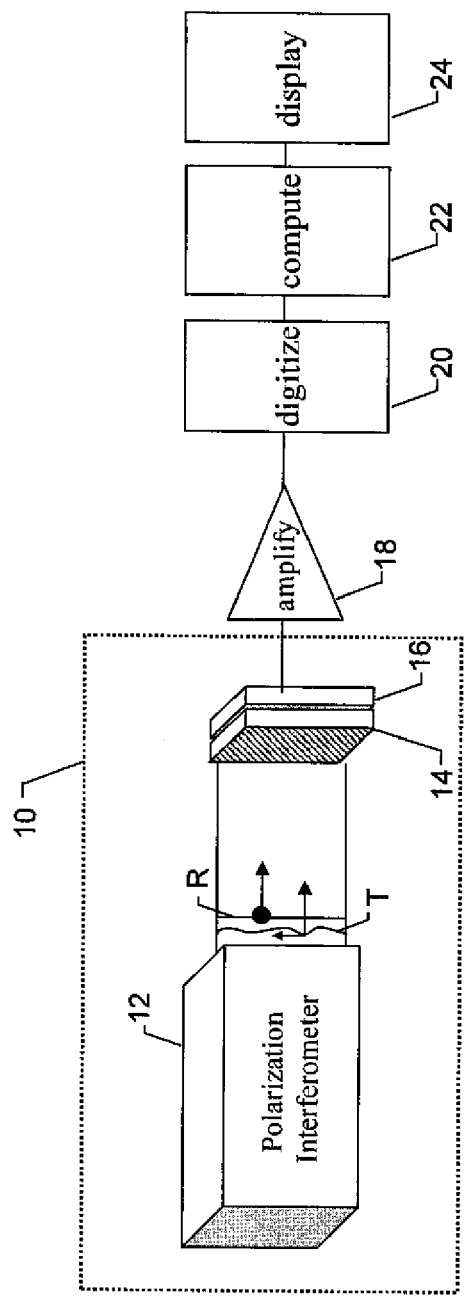
FIG. 1 is a schematic perspective view of a measurement apparatus configured in accordance with the present invention, particularly illustrating the measurement apparatus with functional blocks.

Turning to the drawings, wherein like parts are designated throughout with like numerals and symbols, FIG. 1 illustrates schematically a complete measurement system 10 according to the invention. The system consists of a polarization interferometer 12 that generates a reference wavefront R and a test wavefront T having orthogonal polarization states (which can be linear as well as circular) with respect to each other; a linear-carrier phase mask (LCPM) 14 that introduces an effective phase-delay between the reference and test wavefronts at each element and subsequently interferes the transmitted light; and a detector array 16 that converts the optical intensity sensed at each pixel to an electrical charge. The measurement system 10 may also include an amplifier 18 that converts the electrical charge to a voltage, a digitization circuit 20 that converts the voltage to a digital bit stream, a computer 22 that processes the digital bit stream to calculate optical phase difference, and a display 24 that conveys the result in visible form and may permit user interaction in conventional manner.

The LCPM 14 is preferably configured to have an effective pitch or spacing between elements that is identical to, or an integer multiple of, the pixel pitch of the detector array 16, as measured normal to the axis of the stripes of the LCPM (see the figure). Additionally, the LCPM 14 is rotationally and axially aligned with respect to the detector array 16 so that only a single region of the linear-carrier phase-mask is substantially coincident with each pixel of the detector array. A "region" of the LCPM is intended to refer to a set of elements in the phase-mask producing the same phase shift. Accordingly, a region includes separate linear strips of elements, extending over one dimension of the phase-mask, that are adjacent to strips belonging to other regions of the phase-mask. As used herein, the term "linear" is intended to cover a straight as well as a curvilinear strip of contiguous phase-mask elements.

The LCPM 14 and the detector array 16 may be located in substantially the same image plane, or positioned in conjugate image planes. For the purpose of this disclosure, "same image plane" is defined as separated by less than the depth of image focus, including the so-called Talbot image planes. FIG. 1 shows an exemplary embodiment of the invention wherein the LCPM 14 and the detector array 16 are located substantially at the same image plane. The LCPM can be directly deposited over or affixed onto the detector array 16 or can be mechanically registered and separated by a small gap.

Figure 2:
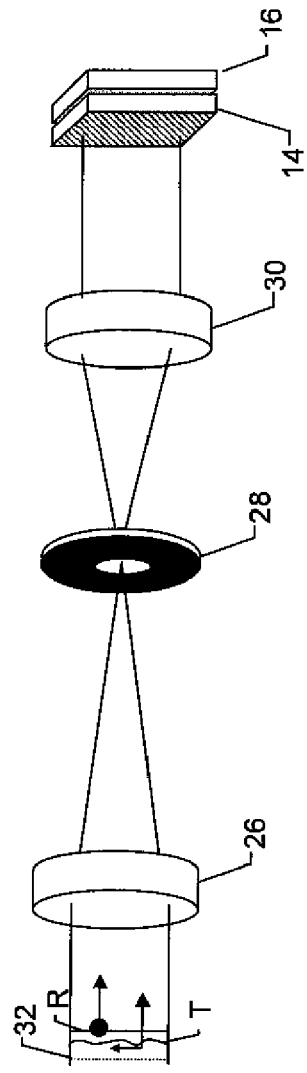
FIG. 2 is a schematic perspective view of an exemplary embodiment of the invention for quantitative measurement of optical path difference.

FIG. 2 illustrates an imaging system comprising an input lens 26, an aperture 28, and an exit lens 30, that may be used to relay the reference wavefront R and the test wavefront T onto the LCPM 14 and the detector array 16. The focal length of the lenses and the spacing between lenses are adjusted properly to form an image of the input pupil plane 32 at the location of the LCPM 14. The aperture 28 is preferably selected so that the diffraction-limited spot size at the LCPM is approximately 2 effective pixels in diameter in order to avoid aliasing of the interference pattern spatial frequency. This selection of the aperture 28 ensures that spatial frequencies higher than the pixel spacing are not present in the final interference pattern.

An alternative embodiment is shown in FIG. 3, wherein the LCPM 14 is positioned at the input pupil plane 32 and relay optics 34 are used to re-image the light transmitted through the LCPM onto the detector array 16. One advantage of this embodiment is the ability to scale the "effective size of each region" of the LCPM 14 as desired relative to the detector array 16 by introducing magnification in the relay optics 34. Thus, the physical pitch of the LCPM 14 (the spacing between adjacent strips of equal elements) and the detector array 16 (the spacing between adjacent rows of pixels) do not need to be equal. In addition, the LCPM 14 and the detector array 16 can be located in conjugate image planes to within an arbitrarily high degree of precision.

The effective phase-shift of each element of the LCPM 14 can have any spatial distribution; however, it is highly desirable to have a regularly repeating pattern. A preferred embodiment for the LCPM is based on an arrangement wherein the elements of neighboring regions are in quadrature with respect to each other; that is, there is a ninety-degree relative phase shift between neighboring regions. Many algorithms exist in the art for calculating phase from sampled data in quadrature [see for example, Interferogram Analysis for Optical Testing, Malacara et. al., Marcel Decker, Inc. New York, 1998].

The linear-carrier phase mask 14 may be implemented in various ways. For example, FIG. 4A illustrates an embodiment wherein the input polarization of the reference and test wavefronts is left-hand and right-hand circular, respectively. In the case of circular input polarization, the LCPM 14 can be constructed from an array 40 of oriented polarizers, such as taught by Kothiyal and Delisle. They showed that the intensity of two beams having orthogonal circular polarization (i.e., right-hand circular and left-hand circular) that are interfered by a polarizer is given by $$I(x, y) = \frac{1}{2}(I_r + I_s + 2\sqrt{I_r I_s} \cos(\Delta\phi(x, y) + 2\alpha_p)), \quad (1)$$

where $\alpha_p$ is the angle of the polarizer with respect to the x, y plane. (See "Shearing Interferometer for Phase Shifting Interferometry with Polarization Phase Shifter," Applied Optics Vol. 24, No. 24, pp. 4439-4442, 1985.)

From this relation it can be seen that a polarizer oriented at zero degrees causes interference between the in-phase (i.e., 0°) components of the incident reference and test wavefronts R and T. A polarizer oriented at 45 degrees interferes the in-phase quadrature (i.e., 90°) component between the incident reference and test wavefronts R and T. A polarizer oriented at 90 degrees interferes the out-of-phase (i.e., 180°) component between the incident reference and object wavefronts R and T. Finally, a polarizer oriented at 135 degrees interferes the out-of-phase quadrature (i.e., 270°) component between the incident reference and test wavefronts R and T.

If the input polarization is linear, a quarter waveplate, oriented with the fast axis at 45 degrees with respect to the reference wavefront polarization axis, can be used to convert the wavefronts to opposite circular polarizations. FIG. 4B illustrates the use of a quarter-wave retarder 42 in combination with the oriented polarizer array 40 of FIG. 4A. For convenience, the quarter-wave retarder 42 may be adjoined to the oriented polarizer array 40 to form the LCPM 14; however, the two elements do not need to be in contact and could be separated by a substantial distance or separated by other imaging optics.

Helen et al. (see "Achromatic Phase-Shifting by a Rotating Polarizer," Optics Communications 154, pp. 249-254, 1998) demonstrated that by combining conventional half-wave and quarter-wave plates in series an effective quarter-wave plate may be constructed that works over a broad wavelength range. Thus, the quarter-wave retarder 42 may be constructed by abutting several conventional half-wave and quarter-wave retardation plates in combination. This permits operation over a broad range of wavelengths or with a single broadband source.

An alternative embodiment of the LCPM 14, shown in FIG. 4C, consists of a birefringent phase plate 44 combined with a linear polarizer 46. The birefringent phase plate 44 could be constructed from a uniform birefringent substrate that is etched in depth so that each region has a discrete thickness of material that results in the desired phase-shift.

Figure 5:
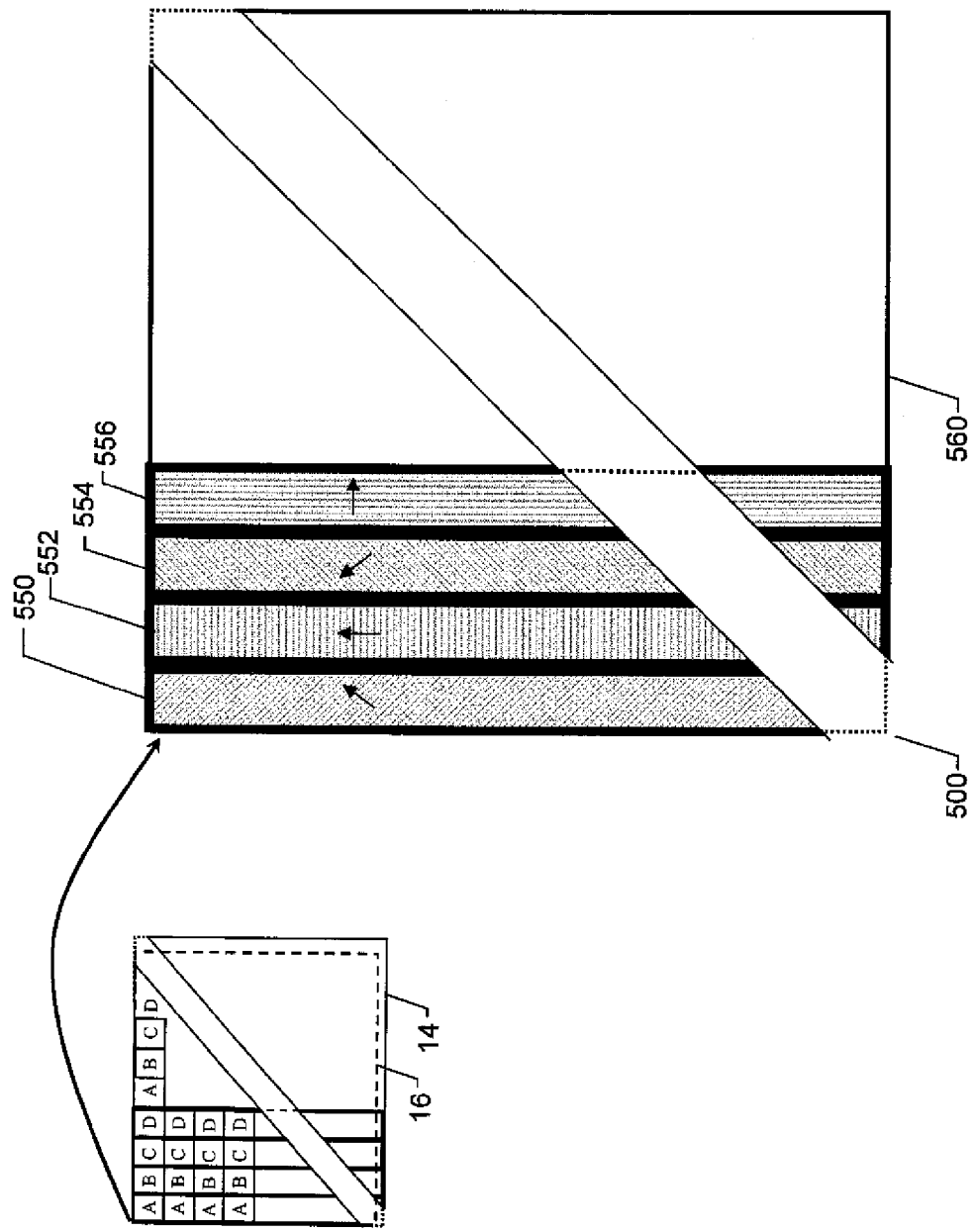
FIG. 5 is a schematic plan view of the linear-carrier phase-mask of FIGS. 1-4 illustrating one possible orientation for the polarization elements.

One embodiment for an LCPM 14 consisting of the oriented polarizer array 40 of FIG. 4A is illustrated in FIG. 5. A unit stripe 500 consists of four polarizer elements 550, 552, 554, and 556 over a substrate 560 oriented, respectively, at 0 degrees (550), 45 degrees (556), 90 degrees (552), and 135 degrees (554). The unit stripe 500 extends over one dimension of the phase-mask and is repeated across the entire LCPM 14 in the other dimension and covers the detector array 16. The capital letters A, B, C and D, shown in FIG. 5, represent different phase shifts and corresponding transfer functions at each pixel of the detector array 16 that result from the LCPM 14. The signal measured at each sensor pixel is given by its transfer function, the phase-difference between the reference and test beams, and the amplitude of each beam. For example, one possible configuration is, $$A(x, y) = \frac{1}{2}(I_r + I_s + 2\sqrt{I_r I_s} \cos(\Delta\phi(x, y))) \quad (2a)$$

$$B(x, y) = \frac{1}{2}\left(I_r + I_s + 2\sqrt{I_r I_s} \cos\left(\Delta\phi(x, y) + \frac{\pi}{2}\right)\right) \quad (2b)$$

$$C(x, y) = \frac{1}{2}(I_r + I_s + 2\sqrt{I_r I_s} \cos(\Delta\phi(x, y) + \pi)) \quad (2c)$$

$$D(x, y) = \frac{1}{2}\left(I_r + I_s + 2\sqrt{I_r I_s} \cos\left(\Delta\phi(x, y) + \frac{3\pi}{2}\right)\right) \quad (2d)$$

wherein $I_r(x,y)$ and $I_s(x,y)$ are the intensities of the reference and test wavefronts R and T at each x,y coordinate in the image, respectively, and $\Delta\phi(x,y)$ is the optical path difference between the reference and test wavefronts.

Multiple interferograms can thus be synthesized by combining pixels with like transfer functions. Referring to FIG. 5, the pixels with transfer functions equal to A can be combined into an interferogram that is a continuous fringe map that opticians are accustomed to viewing for alignment, which can be displayed on a screen in real-time. The B, C, and D pixels can be similarly combined to produce corresponding interferograms. The resulting interferograms have a total number of pixels equal to (n×m)/N, where n and m are the numbers of pixels in the detector array in the x and y directions, respectively, and N is the number of different discrete phase-shift elements in the linear-carrier phase mask 14. In the example of FIG. 5, N is equal to four. The resulting four interferograms can be processed by a variety of algorithms that are well-known in the art for calculating phase difference and modulation index.

For example, a possible implementation for measuring phase difference is a simple four-bucket algorithm, e.g., $$\Delta(x,y) = \tan^{-1}\{[C(x,y) - A(x,y)] \div [D(x,y) - B(x,y)]\}, \quad (3)$$

where the values A, B, C, and D are taken from adjacent neighboring pixels. Similarly, a modulation index map can be generated (similar to the phase-difference map) using the formula $$\gamma(x, y) = \frac{2\sqrt{(A(x, y) - C(x, y))^2 + (D(x, y) - B(x, y))^2}}{D(x, y) + B(x, y) + A(x, y) + C(x, y)}. \quad (4)$$

Figure 6:
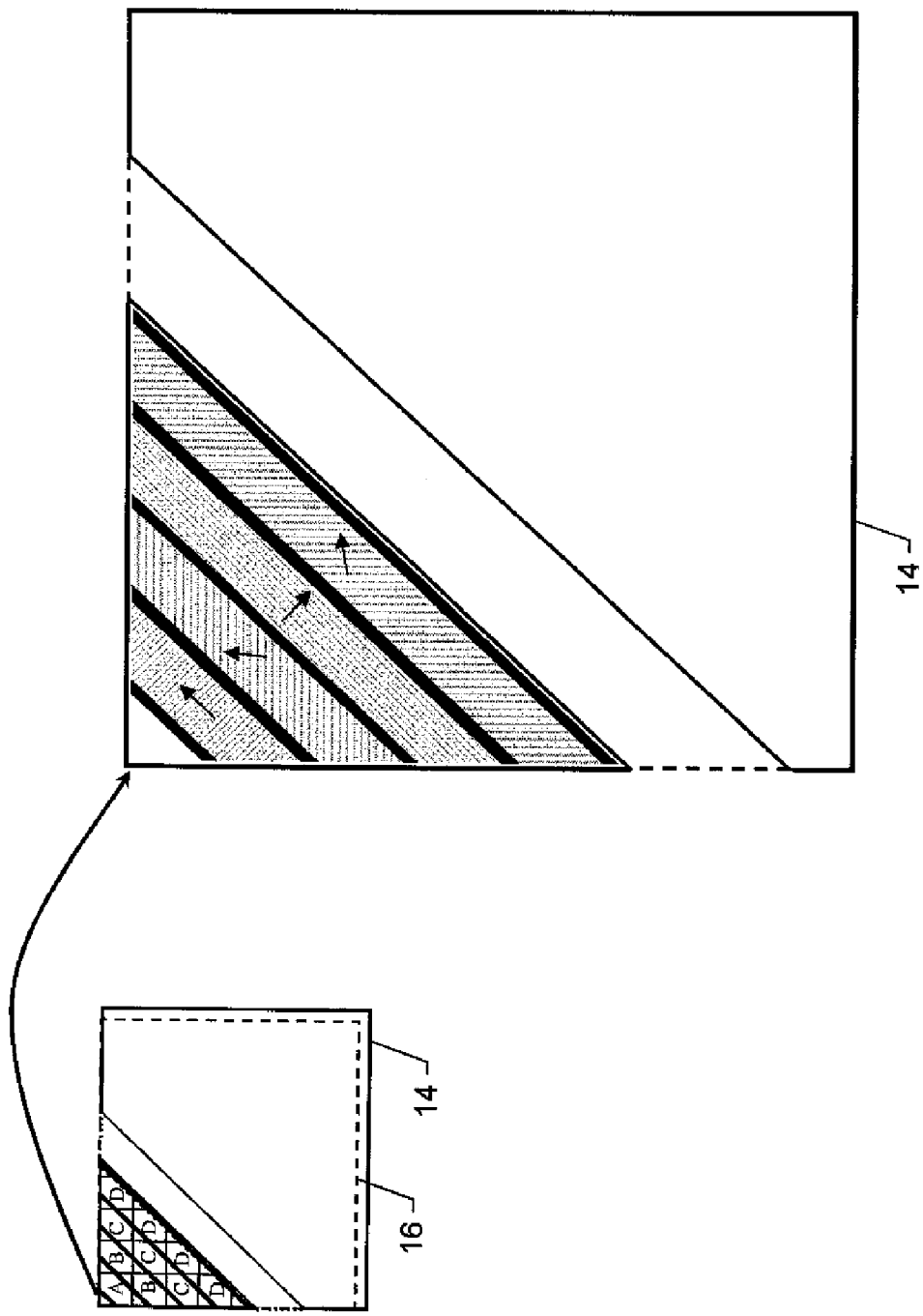
FIG. 6 is a schematic plan view of the linear-carrier phase-mask of FIGS. 1-4 illustrating another possible orientation for the polarization elements.

An alternative embodiment for arranging the LCPM 14 with respect to the detector array 16 is shown in FIG. 6. The LCPM 14 is oriented at an angle with respect to the detector pixel array 16. The method for calculating the phase difference at each spatial coordinate is to combine the measured signals of neighboring pixels in a fashion similar to a windowed convolution algorithm. This method provides an output phase-difference map having a total number of pixels equal to (n−W) times (m−V), where W and V are the sizes of the correlation window in the x and y directions, respectively.

The polarizer elements of the LCPM 14 can be constructed, for example, by the deposition of thin conducting wire grids oriented as arrays as shown in FIG. 5. The polarization elements could also be fabricated from oriented thin films, both in crystalline and amorphous form (for example, the polarizing solution sold by Sterling Optics, Inc., of Williamstown, Ky., under the trademark POLARCOAT). The polarizer elements may be disposed in a planar arrangement, as shown in FIG. 7A, or in a multi-layer arrangement, as seen in FIG. 7B, as long as the total thickness of the device is small compared to the lateral dimensions (less than ~1/4 ratio).

Figure 8:
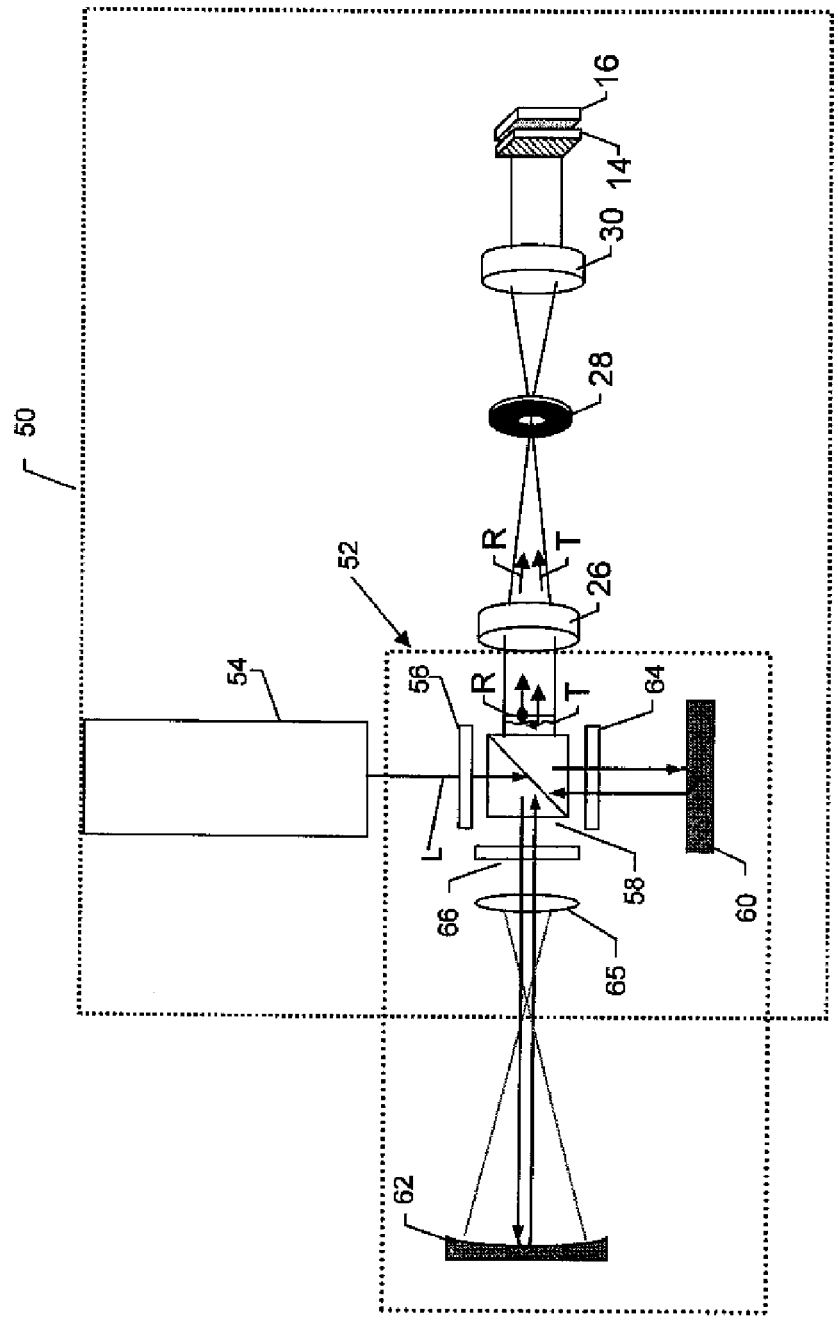
FIG. 8 is a schematic view of a system illustrating the linear-carrier phase-mask of the invention combined with a Twyman-Green polarization interferometer.

A complete measurement system 50 according to the invention is illustrated in FIG. 8, wherein the linear-carrier phase-mask 14 is used, for illustration, in conjunction with a conventional Twyman-Green interferometer 52. A linearly polarized beam L from a light source 54 is combined with a half-wave plate 56 to produce a linearly polarized beam of desired polarization angle directed to a polarizing beam splitter 58, which in turn generates a reference beam directed toward a reference surface 60 and a test beam directed toward a test surface 62 that are linearly polarized along orthogonal axes. Quarter-wave plates 64 and 66 are used to rotate the test and reference beams T and R after reflection while retaining their mutually orthogonal linear polarization states, so that they may be transmitted through and reflected from the beam splitter 58, respectively, toward the relay optics 26, 28 and 30. A coupling lens 65 is used in combination with test surface 62 to return a substantially collimated test beam T.

Figure 9:
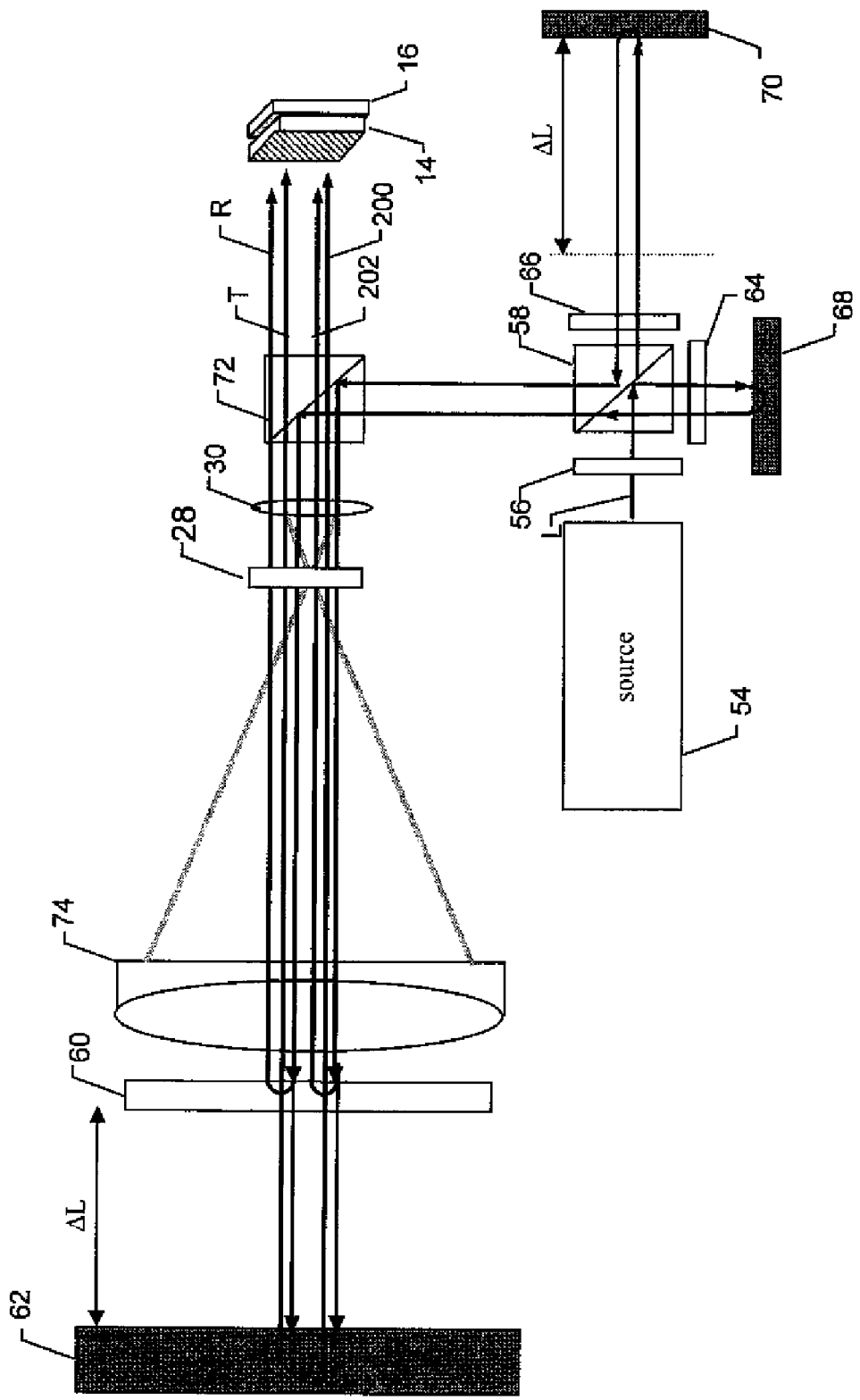
FIG. 9 is a schematic view of a system illustrating the linear-carrier phase-mask of the invention combined with a Fizeau polarization interferometer.

As one skilled in the art would readily understand, the linear-carrier phase-mask of the invention can similarly be combined in a plurality of other systems designed to carry out particular types of real-time measurement, such as with a Fizeau interferometer, a Mirau interferometer, a Michelson interferometer, a microscope profilometer, a wavefront sensor, and a strain sensor. For example, FIG. 9 shows an LCPM 14 and a detector 16 at the back end of a Fizeau interferometer. An optical delay line is used to generate two beams separated by an optical path delay ΔL, as taught by Kuchel et al. in U.S. Pat. No. 4,872,755. The input beam L is directed by a beam splitter 58 toward two mirrors 68 and 70 along preferably orthogonal optical paths differing in length by the amount ΔL. The two reflected beams are then redirected by the beam splitter 58 and injected into the Fizeau interferometer through another beam splitter 72, where they are both reflected from the reference surface 60 and the test surface 62. At the focal plane of the primary lens 74, the mutually orthogonal linearly polarized test and reference beams T,R are passed through an aperture 28, a collimating lens 30, and again through the beam splitter 72 toward the LCPM 14. The length of the delay line is adjusted to produce the same path delay as in the Fizeau cavity, so that the reference beam R and the test beam T are temporally coherent and yield high-contrast interference fringes in the spatial phase-shift interferometer constituted by the linear-carrier phase-mask 14. Thus, interference between extra reflections 202 and 200 as well as interference of spurious reflections from the imaging optics are suppressed.

It is noted that, as in the configuration of FIG. 8, the beams produced by the delay line need to be polarized to have orthogonal linear polarizations. To that end, the beam splitter 58 needs to be a polarizing beam splitter and additional polarizing elements, such as quarter-wave plates 64 and 66, are introduced in conventional manner in the optical paths of the two beams directed toward the mirrors 68 and 70, respectively, of the delay line to allow all of the light in the input beam L to be transmitted toward the Fizeau cavity.

Figure 10:
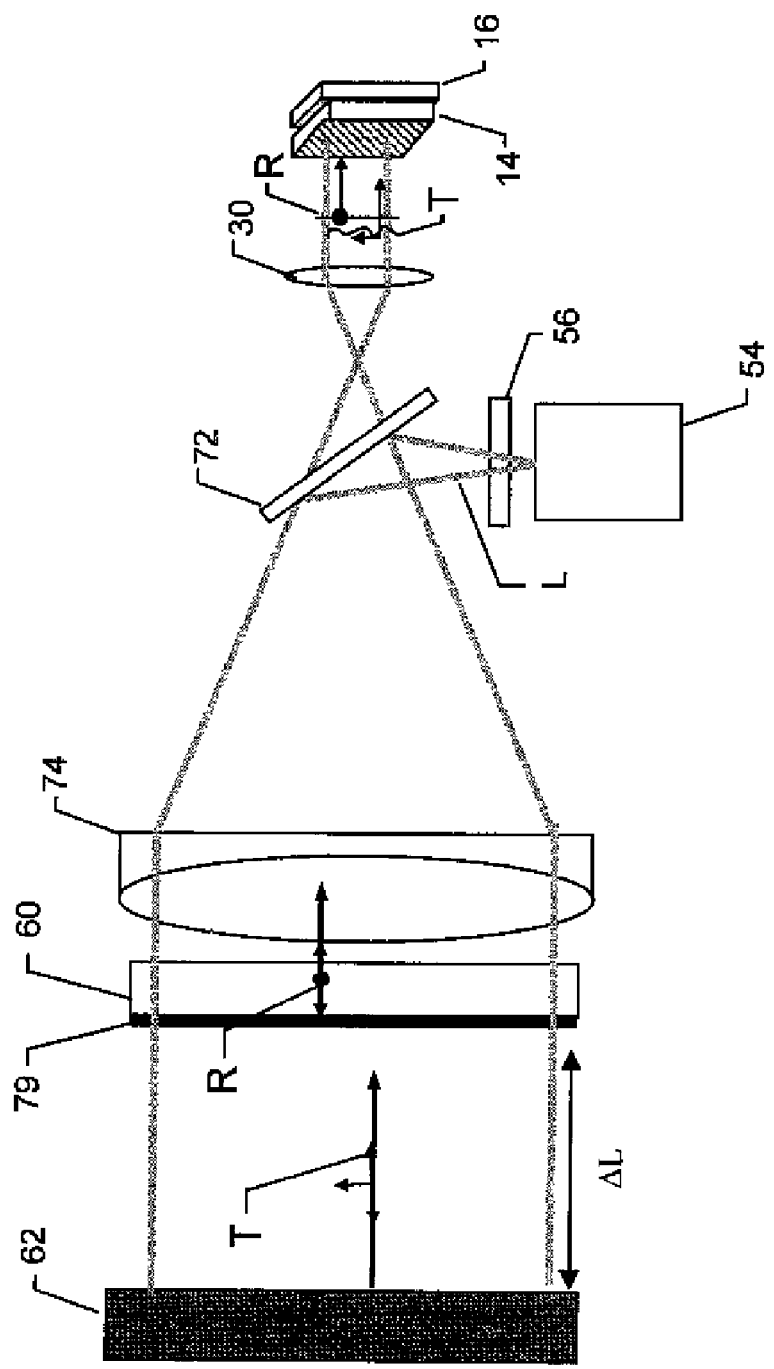
FIG. 10 illustrates a particular embodiment of Fizeau polarization interferometer where the polarization of the test and reference beams is achieved with a thin conductive wire grid deposited over the reference surface beam splitter.

In a preferred embodiment of Fizeau polarization interferometer, the test and reference beams are polarized by depositing a thin conductive wire grid as disclosed above and shown in FIGS. 5-7. FIG. 10 illustrates such Fizeau interferometer where a non-polarizing beam splitter 72 is used to direct the source radiation into the Fizeau Cavity and the reference surface beam splitter 60 is coated with a thin grid 79 of conductive wire. Such wire grids have been used extensively to produce a linearly polarized beam in transmission, but not in reflection because the retained polarization state of the reflected beam was not appreciated. In fact, the use of any other conventional polarizing thin film (e.g., polymer films, Polarcor) will not produce the desired orthogonally polarized reference beam when working at near normal incidence angle. A measurement of the contrast in the reflected channel shows that it is adequate for making good measurements (>10:1).

As described with reference to FIG. 10, the input beam L, after adjustment of its polarization state through a half-wave plate 56, is directed by a non-polarizing beam splitter 72 and injected into the Fizeau interferometer. As they pass through the grid 79 of the polarizing beam splitter 60, the two orthogonal polarization components of each beam are separated by transmission and reflection, thereby producing return test and reference beams T,R that are orthogonally polarized.

Figure 11:
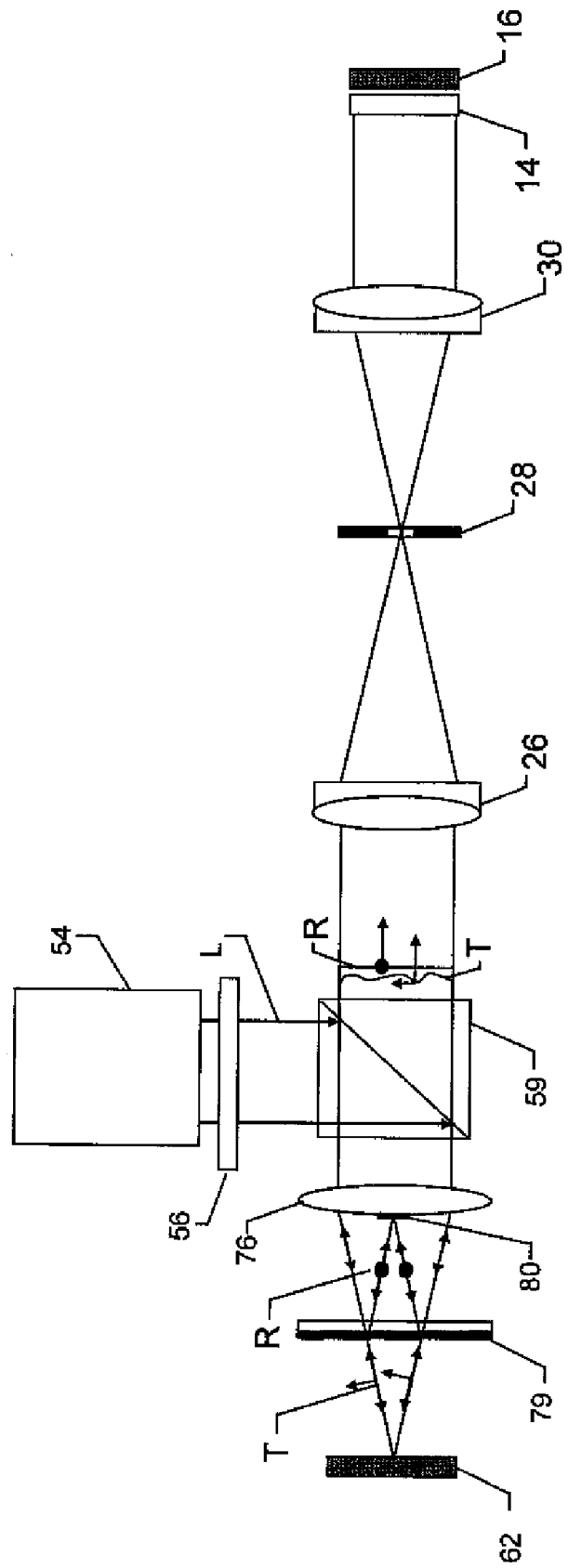
FIG. 11 is a schematic view of a system illustrating the linear-carrier phase-mask of the invention combined with a Mireau-type polarization interferometer that includes a thin conductive wire grid deposited over the reference surface beam splitter to produce orthogonal linearly polarized reference and test beams.

FIG. 11 illustrates a measurement system configured to perform profilometry using a modified Mireau-type interferometer. The profilometer is configured to perform on-axis illumination and viewing, which is useful for obtaining three-dimensional (3D) information of the sample object 62. Many industries utilize profilometry in research and development, quality control and manufacturing, including the semiconductor and medical industries. Such a system includes a light source 54 that transmits a light beam L characterized by a predetermined coherence length Lc. A non-polarizing beam splitter 59 directs the light to a microscope objective 76 that consists of a standard Mireau objective lens modified through the introduction of a polarization beam splitter 78 that reflects one polarization to form a reference beam R while transmitting the remaining portion to form the test beam T. Again, the preferred embodiment of such a polarization thin-film beam splitter 78 is constructed by depositing an array of fine conducting wires 79 on a glass substrate. The reference beam R is reflected from a high quality reflective spot 80 (with surface flatness<λ/10) located within the objective (possibly coated on one of the lens elements) and is subsequently reflected from the polarization thin-film beamsplitter 78 a second time, re-collimated by the objective lens 76, and transmitted to the LCPM interferometer 14. The test beam T is reflected from the target 62, transmitted through the polarization thin-film beam splitter 78, re-collimated by the objective lens 76, and transmitted to the LCPM interferometer. The test beam T and the reference beam R have orthogonal linear polarizations.

It is clear that suitable software applications may be utilized by the computer 22 (see FIG. 1) for data acquisition and processing for each of the foregoing embodiments of measuring systems according to the invention and as taught in Ser. No. 11/800,840.

Those skilled in the art will understand that the preceding exemplary embodiments of the invention provide the foundation for numerous alternatives and modifications that are also deemed within the scope of the invention. For example, a pixelated phase-mask, as taught in U.S. Pat. No. 7,230,717, herein incorporated by reference in its entirety, can be used in the Fizeau and Mireau embodiments of FIGS. 10 and 11 instead of the linear-carrier masks described here. Also, where the invention has been described using linearly polarized test and reference beams directed to the linear-carrier phase-mask, it is clear that circularly polarized beams would work as well in all of the disclosed systems so long as orthogonally polarized. Similarly, the drawings illustrate phase-masks with straight linear strips of elements belonging to each phase-shift region, but curvilinear strips could also be used to implement the invention, subject of course to the manufacture and alignment complications that such implementations would produce. Therefore, while the invention has been shown and described herein in what is believed to be the most practical and preferred embodiments, it is recognized that departures can be made therefrom and the invention is not to be limited to the disclosed details but is to be accorded the full scope of the claims to embrace any and all equivalent apparatus and methods.

The invention claimed is:

1. A polarization Mireau interferometer comprising:
   means for producing a light beam;
   a reference surface;
   a sample surface; and
   an objective with a polarization beam splitter that reflects a polarization component of said light beam toward said reference surface and transmits an orthogonal component thereof toward said sample surface, said beam splitter including an array of conducting wires optically coupled to a glass substrate, said beam splitter being capable of reflecting said polarization component when the light beam is incident upon the beam splitter at a substantially zero angle of incidence.

2. The Mireau interferometer of claim 1, wherein said interferometer is included in an interferometric measurement system that comprises:
   a pixelated phase-mask adapted to receive orthogonally polarized test and reference beams produced by the interferometer as a combined beam, said phase-mask including a plurality of sets of phase-mask pixels, each set being adapted to produce a predetermined phase shift between the test and reference beams, wherein said combined beam impinges in undivided form upon each of said sets of phase-mask elements along a single optical axis;
   a light detector in optical alignment with the phase-mask, each of said plurality of sets of phase-mask pixels being aligned with a corresponding set of detector pixels; and
   means for performing an interferometric measurement based on said predetermined phase shift between the test and reference beams.

3. The Mireau interferometer of claim 2, wherein said interferometric measurement system further includes relaying optics to form an image of an input pupil plane at a location substantially coincident with the linear-carrier phase-mask.

4. An interferometric measurement system that comprises:
   an interferometer including an objective with a polarization beam splitter that reflects a polarization component of an incident light beam and transmits an orthogonal component thereof, said beam splitter including an array of conducting wires optically coupled to a glass substrate;
   a linear-carrier phase-mask adapted to receive orthogonally polarized test and reference beams produced by the interferometer as a combined beam, said phase-mask including a plurality of linear sets of phase-mask elements, each set being adapted to produce a predetermined phase shift between the test and reference beams, wherein said combined beam impinges in undivided form upon each of said sets of phase-mask elements along a single optical axis;
   a light detector in optical alignment with the phase-mask, each of said plurality of sets of phase-mask elements being aligned with a corresponding set of detector pixels; and
   means for performing an interferometric measurement based on said predetermined phase shift between the test and reference beams.

5. The Mireau interferometer of claim 4, wherein said interferometric measurement system further includes relaying optics to form an image of an input pupil plane at a location substantially coincident with the linear-carrier phase-mask.

6. A polarization Fizeau interferometer comprising:
   means for producing a light beam;
   a reference surface;
   a sample surface;
   an objective; and
   a polarization beam splitter that reflects a polarization component of said light beam toward said reference surface and transmits an orthogonal component thereof toward said sample surface, said beam splitter including an array of conducting wires optically coupled to a glass substrate, said beam splitter being capable of reflecting said polarization component when the light beam is incident upon the beam splitter at a substantially zero angle of incidence.

7. The Fizeau interferometer of claim 6, wherein said interferometer is included in an interferometric measurement system that comprises:
   a pixelated phase-mask adapted to receive orthogonally polarized test and reference beams produced by the interferometer as a combined beam, said phase-mask including a plurality of sets of phase-mask pixels, each set being adapted to produce a predetermined phase shift between the test and reference beams, wherein said combined beam impinges in undivided form upon each of said sets of phase-mask elements along a single optical axis;
   a light detector in optical alignment with the phase-mask, each of said plurality of sets of phase-mask pixels being aligned with a corresponding set of detector pixels; and
   means for performing an interferometric measurement based on said predetermined phase shift between the test and reference beams.

8. A Fizeau interferometric measurement system that comprises:
   an interferometer including a polarization beam splitter that reflects a polarization component of an incident light beam and transmits an orthogonal component thereof, said beam splitter including an array of conducting wires optically coupled to a glass substrate;
   a phase-mask adapted to receive orthogonally polarized test and reference beams produced by the interferometer as a combined beam, said phase-mask including a plurality of linear sets of phase-mask elements, each set being adapted to produce a predetermined phase shift between the test and reference beams, wherein said combined beam impinges in undivided form upon each of said sets of phase-mask elements along a single optical axis;
   a light detector in optical alignment with the phase-mask, each of said plurality of sets of phase-mask elements being aligned with a corresponding set of detector pixels; and
   means for performing an interferometric measurement based on said predetermined phase shift between the test and reference beams.

* * * * *